United States Patent
Stone

(10) Patent No.: US 7,614,069 B2
(45) Date of Patent: Nov. 3, 2009

(54) MULTI-DEVICE DISTRIBUTED DIGITAL VIDEO RECORDING SYSTEMS AND METHODS

(75) Inventor: Christopher J. Stone, Newtown, PA (US)

(73) Assignee: General Instrument Corporation, Horsham, PA (US)

( * ) Notice: Subject to any disclaimer, the term of this patent is extended or adjusted under 35 U.S.C. 154(b) by 904 days.

(21) Appl. No.: 10/724,943

(22) Filed: Dec. 1, 2003

(65) Prior Publication Data

US 2005/0120386 A1    Jun. 2, 2005

(51) Int. Cl.
*H04N 7/173*    (2006.01)
(52) U.S. Cl. .......................................... 725/89; 725/87
(58) Field of Classification Search ............... 725/89
See application file for complete search history.

(56) References Cited

U.S. PATENT DOCUMENTS

| | | | |
|---|---|---|---|
| 6,637,027 B1 * | 10/2003 | Breslauer et al. ............... | 725/25 |
| 6,983,480 B1 * | 1/2006 | Sie et al. ......................... | 725/25 |
| 2002/0162109 A1 * | 10/2002 | Shteyn .......................... | 725/87 |
| 2002/0184638 A1 * | 12/2002 | Agnihotri et al. .............. | 725/89 |
| 2003/0237097 A1 * | 12/2003 | Marshall et al. ............. | 725/105 |
| 2005/0080858 A1 * | 4/2005 | Pessach ....................... | 709/206 |
| 2005/0216942 A1 * | 9/2005 | Barton ......................... | 725/97 |

* cited by examiner

*Primary Examiner*—Joseph P Hirl
*Assistant Examiner*—Fred Peng
(74) *Attorney, Agent, or Firm*—Stewart M. Wiener

(57) ABSTRACT

The present invention provides multi-device distributed digital video recording systems and methods. The present invention enables digital recording devices on a cable plant to share resources. A plurality of networked digital video recorders are provided. A requesting digital video recorder (DVR) on the network may be capable of broadcasting a request to a plurality of DVRs seeking resources of a dormant DVR. At least one dormant DVR on the network may be capable of providing a response to the requesting DVR indicating its availability of resources. The requesting DVR may then select a granting DVR from the dormant DVRs with available resources (i.e., those DVRs that responded to the request). A session may then be established between the requesting DVR and the granting DVR. Once the session is established, the resources of the granting DVR may be made available for use by the requesting DVR.

29 Claims, 4 Drawing Sheets

MULTI-DEVICE DISTRIBUTED DIGITAL VIDEO RECORDING SYSTEMS AND METHODS

BACKGROUND OF THE INVENTION

The present invention relates to the field of multi-media recording and playback. More specifically, the present invention relates to multi-device distributed digital video recording systems and methods.

Current digital video recorder (DVR) and personal versatile recorder (PVR) systems are limited by the number of tuners and the amount of storage space present on the PVR/DVR device. These limitations impede the user's ability to simultaneously record multiple programs and pause and fast-forward live television programming. The amount of storage space limits the number of programs that the user may save to his/her device.

Further, current DVR systems lack the ability to add new tuners once the hardware is delivered to the consumer. The hard disk drives are also limited in size to what is installed in the device at manufacture.

It would be advantageous to provide a digital video recording system that is not limited by the number of tuners or amount of storage physically present at the recording device. The methods and apparatus of the present invention provide the foregoing and other advantages.

SUMMARY OF THE INVENTION

The present invention provides multi-device distributed digital video recording systems and methods. The present invention enables digital recording devices (e.g., a DVR, PVR, or the like) on a cable plant to share resources via the utilization of a command and control protocol and a content delivery mechanism.

In an example embodiment of the invention, a plurality of networked digital video recorders are provided. A requesting digital video recorder (DVR) on the network may be capable of broadcasting a request to a plurality of DVRs seeking resources of a dormant DVR. At least one dormant DVR on the network may be capable of providing a response to the requesting DVR indicating its availability of resources. The requesting DVR may then select a granting DVR from the dormant DVRs with available resources (i.e., those DVRs that responded to the request). A session may then be established between the requesting DVR and the granting DVR. Once the session is established, the resources of the granting DVR may be made available for use by the requesting DVR.

Corresponding methods and systems are provided in accordance with the present invention.

BRIEF DESCRIPTION OF THE DRAWINGS

The present invention will hereinafter be described in conjunction with the appended drawing figures, wherein like numerals denote like elements, and.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing an exemplary embodiment of the invention. It should be understood that various changes may be made in the function and arrangement of elements without departing from the spirit and scope of the invention as set forth in the appended claims.

The present invention provides multi-device distributed digital video recording systems and methods. The present invention enables digital recording devices (e.g., a DVR, PVR, or the like) on a cable plant to share resources via the utilization of a command and control protocol and a content delivery mechanism. The term DVR is used herein to mean any type of digital recording device currently known or to be developed in the future.

Figure 1:
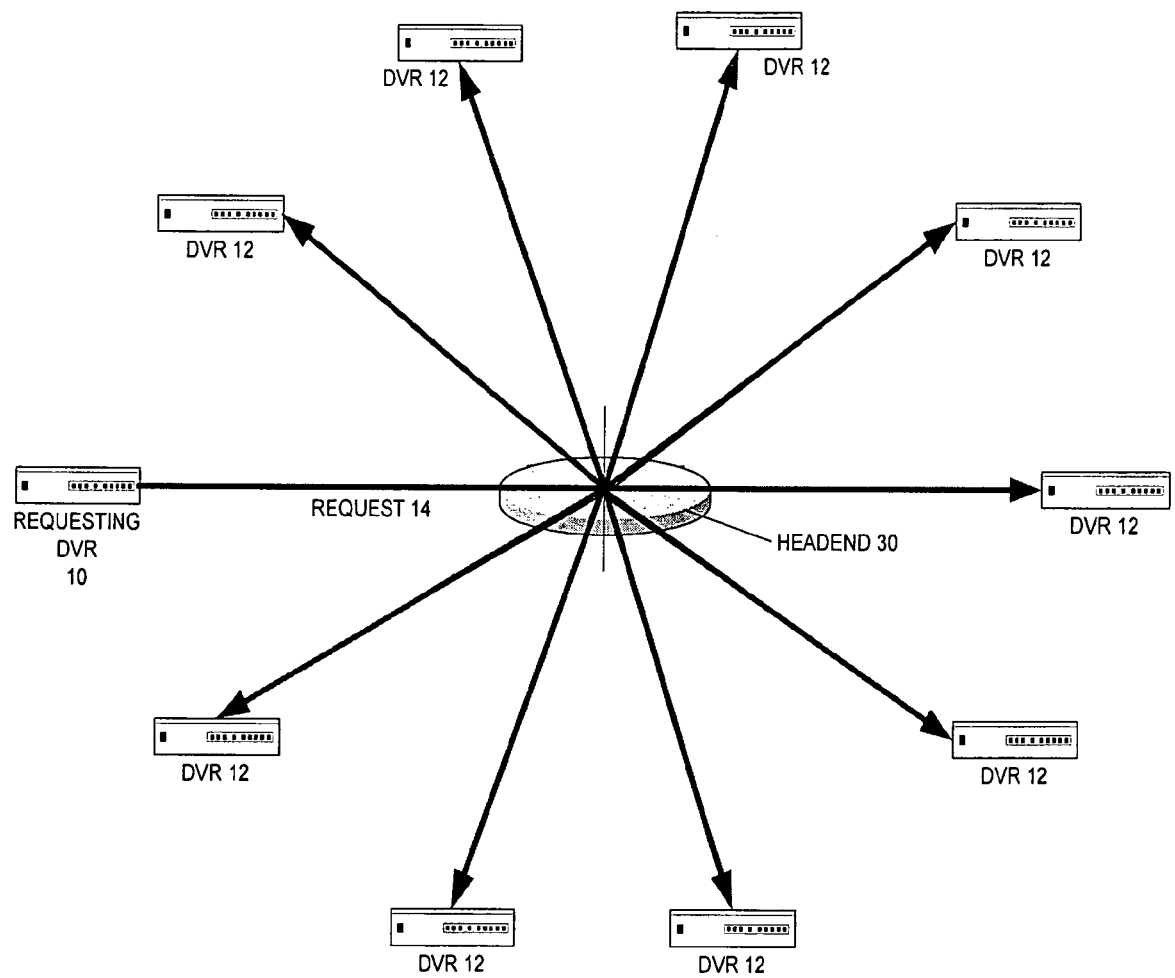
FIG. 1 shows an illustration of an example embodiment of the invention.
Figure 2:
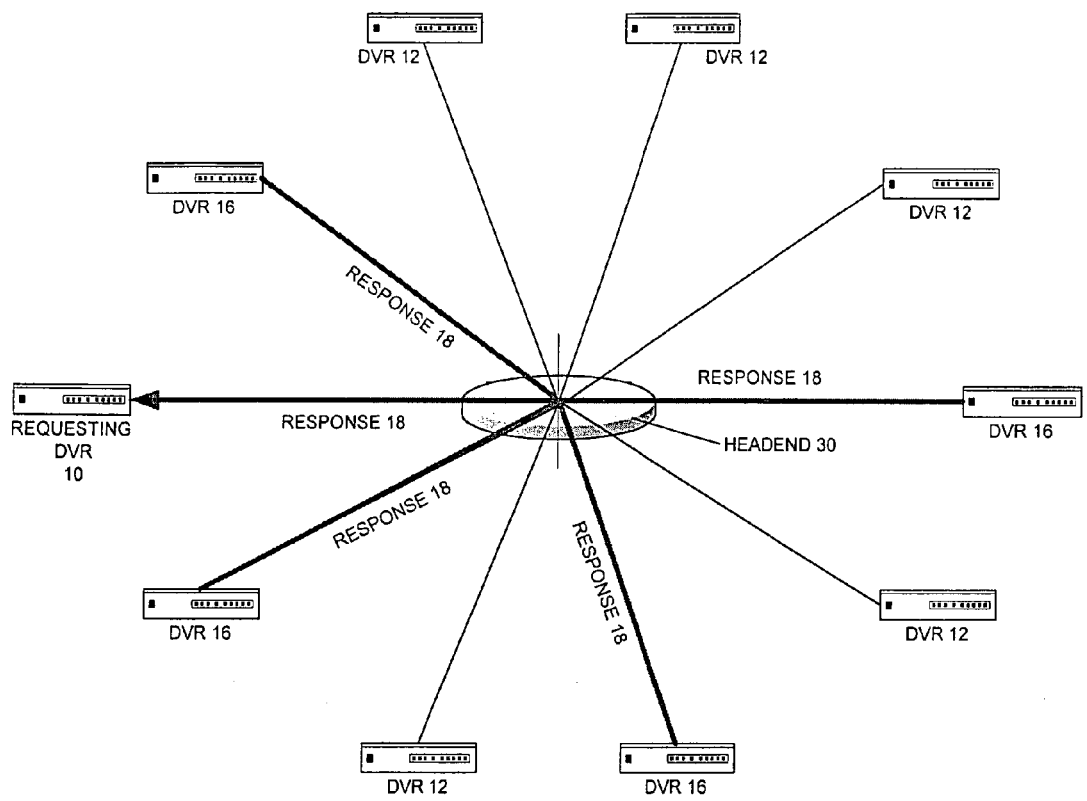
FIG. 2 shows a further illustration of an example embodiment of the invention.
Figure 3:
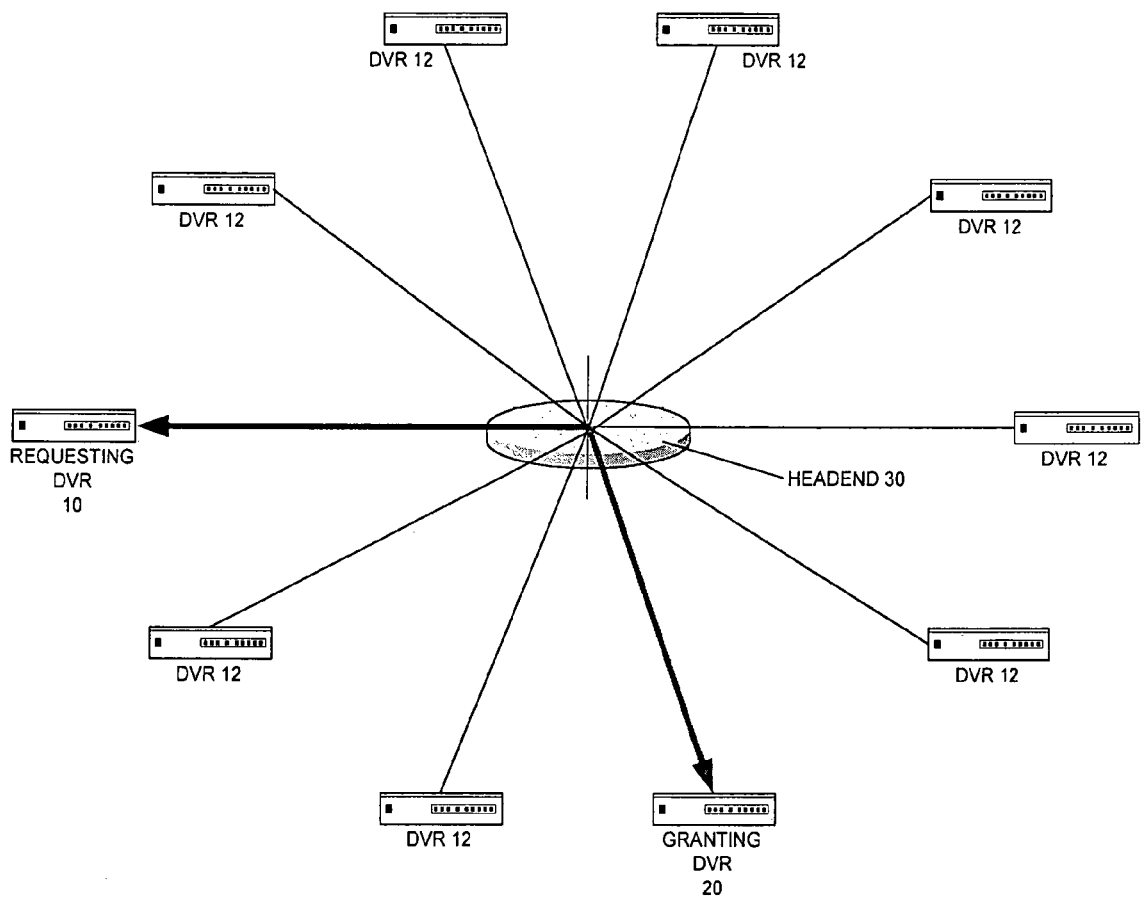
FIG. 3 shows an additional illustration of an example embodiment of the invention.

In an example embodiment of the invention as shown in FIGS. 1-3, a plurality of networked digital video recorders is provided. A requesting digital video recorder (DVR) 10 on the network may be capable of broadcasting a request 14 to a plurality of DVRs 12 seeking resources of a dormant DVR, as shown in FIG. 1. The broadcast may be via Internet Protocol, a telephone path, a proprietary path, or the like. At least one dormant DVR 16 on the network may be capable of providing a response 18 to the requesting DVR 10 indicating its availability of resources, as shown in FIG. 2. The requesting DVR 10 may then select a granting DVR 20 from the dormant DVRs 16 with available resources (i.e., those DVRs 16 that responded to the request), as shown in FIG. 3. A session may then be established between the requesting DVR 10 and the granting DVR 20. Once the session is established, the resources of the granting DVR 20 may be made available for use by the requesting DVR 10.

Figure 4:
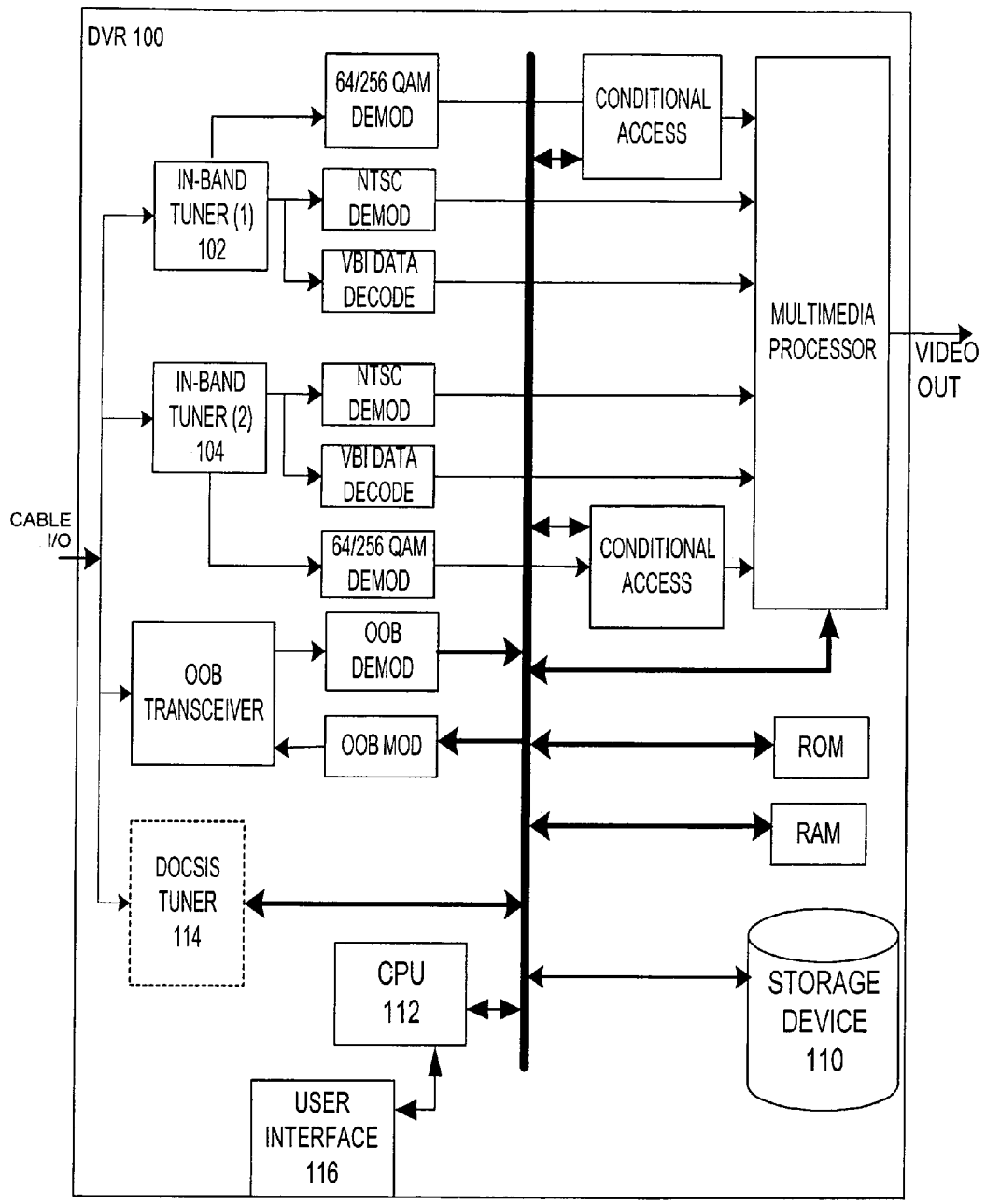
FIG. 4 shows a block diagram of an example digital video recorder in accordance with an example embodiment of the invention.

FIG. 4 shows an example embodiment of a digital video recorder (DVR) 100 for use in a multi-device distributed digital video recording system in accordance with the present invention. The DVR 100 may act as a requesting DVR 10, a dormant DVR 16 with available resources, or a granting DVR 20. The DVR 100 may include at least one tuner (e.g., in-band tuner 102 and in-band tuner 104), at least one storage device 110, and a processor 112. The remaining components of DVR 100 are standard components that are well known in the art, and are not pertinent to the present invention.

Where the DVR 100 acts as a requesting DVR, the processor 112 may be enabled for broadcasting a request to a plurality of networked DVRs seeking resources of a dormant DVR, receiving a response from at least one dormant DVR indicating availability of resources, selecting a granting DVR from the dormant DVRs with available resources, establishing a session with the granting DVR, and utilizing resources of the granting DVR, as discussed above in connection with FIGS. 1-3. Where the DVR is acting as a dormant DVR, the processor may be enabled for receiving a broadcast request from a requesting DVR seeking available resources, responding to the requesting DVR regarding availability of resources, if resources are available and if selected by the requesting DVR, establishing a session with the requesting DVR, and providing resources for use by the requesting DVR, as discussed above in connection with FIGS. 1-3.

The resources may include at least one of a tuner (e.g., tuner 102 or tuner 104) and a storage device 110. Where the resources comprise a tuner 102, 104 of the granting DVR 20, control of that tuner may be turned over to the requesting DVR 10.

The requesting DVR 10 may request that the granting DVR 20 tune to a particular channel and record designated content from that channel. The granting DVR 20 may store the designated content for use by the requesting DVR 10 (e.g., at storage device 110). If the granting DVR 20 does not have access to the particular channel, the granting DVR 20 may advise the requesting DVR 10 that access is not available. The requesting DVR 10 may then request access to the particular channel from the headend 30 on behalf of the granting DVR 20. For example, the requesting DVR 10 may request a conditional access system at the headend 30 to grant temporary permission to the granting DVR 20. If a fee applies (e.g., for a pay-per-view event) the conditional access system may charge the fee to the requesting DVR 10 accordingly and provide temporary access to the granting DVR 20 to acquire the designated content.

The granting DVR 20 may tag the recorded designated content in storage device 110 as being owned by the requesting DVR 10. The granting DVR 20 may encrypt the recorded designated content with an encryption key known to the requesting DVR 10. The encrypted recorded designated content may be made available to the granting DVR 20. For example, the encrypted designated content may be made available to the granting DVR 20 for a fee. The fee may be discounted since the granting DVR 20 allowed its resources to be borrowed.

The requesting DVR 10 may request access to the stored designated content on the storage device 110 of the granting DVR 20. The stored designated content may then be uploaded from the granting DVR 20 to the requesting DVR 10. Alternatively, the stored designated content may be streamed from the granting DVR 20 to the requesting DVR 10. The requesting DVR 20 may control the presentation of the streamed designated content utilizing a command and control channel to send commands to the granting DVR 20. The commands may comprise at least one of play, stop, pause, fast forward, rewind, skip, jump, and the like.

After the designated content is acquired by the granting DVR 20, the granting and requesting DVRs may establish a schedule by which the granting DVR 20 either uploads the content to the requesting DVR 10 or streams the content to the requesting DVR 10 in accordance with a playback request.

A time limit may be imposed on how long the content may be stored on the granting DVR 20. Once the time limit passes without having the requesting DVR 10 retrieve the content, the content may be deleted from the storage device 110. In addition, if the storage device 110 of the granting DVR 20 is needed and the requesting DVR 10 does not have storage space for the content, the stored content may be transferred to another DVR 12 or to the headend 30 for storage.

Alternatively, the granting DVR 20 may automatically forward the stored designated content to a storage device 110 at the requesting DVR 10. The designated content may be forwarded via DOCSIS (Data Over Cable Service Interface Specification) provided both the requesting and granting devices are equipped with DOCSIS tuners 114.

The request for resources may be routed through a system operator at the headend 30. Multiple requests for identical designated content from multiple requesting DVRs 10 may then be handled by a single granting DVR 20.

There may be instances where a user will want to record on the user's DVR, but that DVR is acting as a granting DVR 20 and is providing available resources, such as a tuner 102, 104 and/or a storage device 110 to a requesting DVR 10. In such cases, various options exist for handling the user's request to record: (1) the granting DVR 20 may request a third DVR 12 to finish the recording session; (2) the granting DVR 20 may check back with the requesting DVR 10 to see if its resources are now free to finish the recording session; or (3) the granting DVR 20 may request that a third DVR 12 provide available resources to accommodate the user's request to record, using the methods described above.

When a user requests the DVR to tune to and/or record content and the DVR is functioning as a granting DVR 20, a pop-up notification may be provided advising that the DVR 20 is out of resources and asking whether the resources of another DVR 12 should be requested. The pop-up notification may be generated by a software application running on the DVR processor 112. The user requests may be entered at user interface 116.

The system operator at the headend 30 may provide a credit or a discount to those user's that allow their DVRs to act as a granting DVR 20 and allow their resources to be borrowed. The discount or credit can be provided per session. For example, a pop-up window may be generated each time a request has been received for available resources. The user can then accept or decline the request. Alternatively, the granting function can be switched on or off by the user at the DVR.

The system operator may also charge the requesting device for the right to borrow the resources of the granting DVR 20.

The granting DVR 20 may provide a menu of all content stored thereat to the requesting DVR 10, not just the designated content requested by the requesting DVR 10. Further, once a DVR stores content, it can be made available to other DVRs 12 via the network. For example, the headend 30 may provide a menu of all content stored on the DVRs 12 in the network. This content may be made available to any DVR in the network for a fee.

The present invention solves the problem of limited DVR resources by allowing a user to simultaneously record multiple programs by utilizing the resources of someone else's DVR. Thus, a dual-tuner DVR in this system is not limited to simultaneously recording of only 2 programs. The DVR can now record X number of programs, where X is the number of DVRs on the cable plant that have the available resources to record the content.

It should now be appreciated that the present invention provides advantageous methods and apparatus for enabling distributed digital video recording.

Although the invention has been described in connection with various illustrated embodiments, numerous modifications and adaptations may be made thereto without departing from the spirit and scope of the invention as set forth in the claims.

What is claimed is:

1. A method for providing a multi-device distributed digital video recording system, comprising:
   broadcasting a request from a requesting digital video recorder (DVR) to a plurality of networked DVRs seeking resources of a dormant DVR;
   receiving a response to the request from at least one dormant DVR in the plurality of networked DVRs indicating availability of resources;
   selecting a granting DVR from the at least one dormant DVR with available resources;
   establishing a session between said requesting DVR and said granting DVR;
   providing resources of said granting DVR for use by said requesting DVR;

requesting by the requesting DVR that said granting DVR tune to a particular channel and record designated content from said particular channel to store said designated content at said granting DVR for use by said requesting DVR; and when the granting DVR does not have access to the particular channel, receiving an indication that the granting DVR does not have access to the particular channel; and requesting access to the particular channel by the requesting DVR on behalf of the granting DVR, whereby designated content from said particular channel is recorded by the granting DVR.

2. A method in accordance with claim 1, wherein said resources include at least one of a tuner and a storage device.

3. A method in accordance with claim 1, wherein:
said resources comprise a tuner of said granting DVR; and
control of said tuner is turned over to said requesting DVR.

4. A method in accordance with claim 1, wherein:
a fee is charged to the requesting DVR for the designated content.

5. A method in accordance with claim 1, further comprising:
tagging the recorded designated content as being owned by said requesting DVR.

6. A method in accordance with claim 5, further comprising:
encrypting the recorded designated content with an encryption key known to said requesting DVR.

7. A method in accordance with claim 6, further comprising:
making said encrypted recorded designated content available to said granting DVR.

8. A method in accordance with claim 7, wherein said encrypted designated content is made available to said granting DVR for a fee.

9. A method in accordance with claim 1, further comprising:
requesting access to said stored designated content by said requesting DVR; and
uploading the stored designated content from the granting DVR to said requesting DVR.

10. A method in accordance with claim 1, further comprising:
requesting access to said stored designated content by said requesting DVR; and
streaming the stored designated content from the granting DVR to said requesting DVR.

11. A method in accordance with claim 10, further comprising:
controlling presentation of said streamed designated content utilizing a command and control channel to send commands from said requesting DVR to said granting DVR.

12. A method in accordance with claim 11, wherein said commands comprise at least one of play, stop, pause, fast forward, rewind, skip, and jump.

13. A method in accordance with claim 1, further comprising:
automatically forwarding said stored designated content to a storage device at said requesting DVR.

14. A method in accordance with claim 1, further comprising:
routing said request for resources through a system operator;
wherein multiple requests for identical designated content from multiple requesting DVRs are handled by a single granting DVR.

15. A multi-device distributed digital video recording system, comprising:
a plurality of networked digital video recorders;
a requesting digital video recorder (DVR) capable of broadcasting a request to said plurality of networked DVRs seeking resources of a dormant DVR;
at least one dormant DVR in the plurality of networked DVRs capable of receiving the request and for providing a response to said requesting DVR indicating availability of resources
wherein:
said requesting DVR selects a granting DVR from the at least one dormant DVR with available resources;
a session is established between said requesting DVR and said granting DVR; and
resources of said granting DVR are made available for use by said requesting DVR,
wherein resources of said granting DVR are made available for use by said requesting DVR by:
requesting by the requesting DVR that said granting DVR tune to a particular channel and record designated content from said particular channel to store said designated content at said granting DVR for use by said requesting DVR; and
when the granting DVR does not have access to the particular channel,
receiving an indication that the granting DVR does not have access to the particular channel; and
requesting access to the particular channel by the requesting DVR on behalf of the granting DVR, whereby designated content from said particular channel is recorded by the granting DVR.

16. A system in accordance with claim 15, wherein said resources include at least one of a tuner and a storage device.

17. A system in accordance with claim 15, wherein:
said resources comprise a tuner of said granting DVR; and
control of said tuner is turned over to said requesting DVR.

18. A system in accordance with claim 15, wherein:
a fee is charged to the requesting DVR for the designated content.

19. A system in accordance with claim 15, wherein:
said granting DVR tags the recorded designated content as being owned by said requesting DVR.

20. A system in accordance with claim 19, wherein:
said granting DVR encrypts the recorded designated content with an encryption key known to said requesting DVR.

21. A system in accordance with claim 20, wherein:
said encrypted recorded designated content is made available to said granting DVR.

22. A system in accordance with claim 21, wherein:
said encrypted designated content is made available to said granting DVR for a fee.

23. A system in accordance with claim 15, wherein:
said requesting DVR requests access to said stored designated content; and
the stored designated content is uploaded from the granting DVR to said requesting DVR.

24. A system in accordance with claim 15, wherein:
said requesting DVR requests access to said stored designated content; and
the stored designated content is streamed from the granting DVR to said requesting DVR.

25. A system in accordance with claim 24, wherein:
said requesting DVR controls presentation of said streamed designated content utilizing a command and control channel to send commands to said granting DVR.

26. A system in accordance with claim 25, wherein:
said commands comprise at least one of play, stop, pause, fast forward, rewind, skip, and jump.

27. A system in accordance with claim 15, wherein:
said granting DVR automatically forwards said stored designated content to a storage device at said requesting DVR.

28. A system in accordance with claim 15, wherein:
said request for resources is routed through a system operator; and
multiple requests for identical designated content from multiple requesting DVRs are handled by a single granting DVR.

29. A digital video recorder (DVR) for use in a multi-device distributed digital video recording system, comprising:
at least one tuner;
at least one storage device;
a processor enabled for at least one of:
(a) broadcasting a request to a plurality of networked DVRs seeking resources of at least one dormant DVR;
receiving a response to the request from the at least one dormant DVR indicating availability of resources;
selecting a granting DVR from the at least one dormant DVR with available resources;
establishing a session with said granting DVR; and
utilizing resources of said granting DVR; and
(b) receiving a broadcast request from a requesting DVR seeking available resources;
responding to said requesting DVR regarding availability of resources;
if resources are available and if selected by said requesting DVR, establishing a session with said requesting DVR; and
providing resources for use by said requesting DVR,
wherein resources of said granting DVR are made available for use by said requesting DVR by:
requesting by the requesting DVR that said granting DVR tune to a particular channel and record designated content from said particular channel to store said designated content at said granting DVR for use by said requesting DVR; and
when the granting DVR does not have access to the particular channel,
receiving an indication that the granting DVR does not have access to the particular channel; and
requesting access to the particular channel by the requesting DVR on behalf of the granting DVR, whereby designated content from said particular channel is recorded by the granting DVR.

* * * * *